(12) United States Patent
Srivastava et al.

(10) Patent No.: US 8,561,193 B1
(45) Date of Patent: Oct. 15, 2013

(54) SYSTEMS AND METHODS FOR ANALYZING MALWARE

(75) Inventors: Akhil Srivastava, Uttar Pradesh (IN); Abhijit Limaye, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 490 days.

(21) Appl. No.: 12/781,177

(22) Filed: May 17, 2010

(51) Int. Cl.
*G06F 11/00* (2006.01)
*G06F 12/14* (2006.01)
*G06F 12/16* (2006.01)
*G06F 7/04* (2006.01)
*G06F 17/30* (2006.01)
*G08B 23/00* (2006.01)
*H04N 7/16* (2011.01)
*H04L 29/06* (2006.01)

(52) U.S. Cl.
USPC ............... 726/24; 726/22; 726/23; 726/25; 726/26; 713/152

(58) Field of Classification Search
USPC ............... 726/24, 22, 23, 25, 26; 713/152
See application file for complete search history.

(56) References Cited

U.S. PATENT DOCUMENTS

| | | | | |
|---|---|---|---|---|
| 2007/0136455 A1* | 6/2007 | Lee et al. | ...... | 709/223 |
| 2007/0240217 A1* | 10/2007 | Tuvell et al. | ...... | 726/24 |
| 2008/0201779 A1* | 8/2008 | Tahan et al. | ...... | 726/23 |
| 2009/0187992 A1* | 7/2009 | Poston | ...... | 726/24 |
| 2010/0192222 A1* | 7/2010 | Stokes et al. | ...... | 726/22 |

OTHER PUBLICATIONS

The Malware Cluster Lab-A Forensic Behavioral Analysis of Live Internet Malware Infections; www.cgi.mtc.sri.com/Cluster-Lab/; taken from site on Mar. 8, 2010.
Ulrich Bayer; Scalable, Behavior-Based Malware Clustering; Secure Systems Lab Technical University Vienna; Feb. 10, 2009.
Georg Wicherski; peHash: A Novel Approach to Fast Malware Clustering; www.usenix.org/event/leet09/tech/ full_papers/wicherski/wicherski_html/; taken from site on Mar. 8, 2010.
Tzu-Yen Wang; A Virus Prevention Model Based on Static Analysis and Data Mining Methods; Computer and Information Technology Workshops, 2008, Jul. 18, 2008, pp. 288-293.

* cited by examiner

*Primary Examiner* — Ashok Patel
*Assistant Examiner* — Lawrence Cosby
(74) *Attorney, Agent, or Firm* — ALG Intellectual Property, LLC (57) ABSTRACT

A computer-implemented method for analyzing malware may include: 1) identifying a set of malware samples, 2) identifying, for each malware sample in the set of malware samples, a set of static strings present in the malware sample, and then 3) clustering the set of malware samples based on the set of static strings present in each malware sample. Various other methods, systems, and computer-readable media are also disclosed.

16 Claims, 7 Drawing Sheets

SYSTEMS AND METHODS FOR ANALYZING MALWARE

BACKGROUND

Consumers and businesses face a growing tide of malicious software that threatens the stability and performance of their computers and the security of their data. Computer programmers with malicious motivations have created and continue to create viruses, Trojan horses, worms and other programs in an attempt to compromise computer systems. These malicious programs are often referred to as malware. In an attempt to evade detection, malicious programmers may inject malware into or among legitimate programs.

Many security software companies attempt to combat malware by creating and deploying malware signatures (e.g., hash functions that identify malware) to their customers on a regular basis. However, new malware (along with variants of old malware) continually emerge, leaving a significant amount of malware that cannot be detected using traditional signature-based malware-detection methods.

Unfortunately, ever-increasing volumes of new malware and malware variants create ever-larger sets of malware for vendors to analyze. This may consume the time of malware analysts and/or may consume computing resources. Additionally, growing sets of malware signatures may increase the size of anti-malware products, increase the duration of malware scans, and/or increase bandwidth consumption during signature-definition updates.

SUMMARY

As will be described in greater detail below, the instant disclosure generally relates to systems and methods for analyzing malware. In one example, one or more of the various systems described herein may accomplish this task by: 1) identifying a set of malware samples, 2) identifying, for each malware sample in the set of malware samples, a set of static strings present in the malware sample, and then 3) clustering the set of malware samples based on the set of static strings present in each malware sample.

The systems described herein may cluster the set of malware samples based on the set of static strings present in each malware sample in a variety of ways. For example, the systems described herein may cluster the set of malware samples based on the percentage of static strings shared between malware samples. In some examples, these systems may also create a vector for each malware sample in the set of malware samples, where each dimension in the vector may indicate whether the malware sample includes a corresponding static string.

In some embodiments, the systems described herein may cluster the set of malware samples by: 1) identifying a set of clusters, 2) identifying a candidate cluster in the set of clusters that correlates most strongly with the malware sample based on the set of static strings present in the malware sample, and then 3) adding the malware sample to the candidate cluster. In some examples, these systems may identify the candidate cluster by: 1) identifying a minimum correlation threshold, 2) determining that no cluster in the set of clusters meets the minimum correlation threshold with respect to the malware sample, and then 3) identifying a new cluster in the set of clusters as the candidate cluster.

The set of static strings may include a variety of data. In some examples, the set of static strings may include a set of human-readable strings. Examples of static strings in the set of static strings may include, but are not limited to, a dynamic-link library name, an application programming interface identifier, a section name, a file name, a file path, a service identifier, a process identifier, an Internet address, a resource address, a registry entry, a globally unique identifier, a class identifier, a string in a resource section, a batch file command, a packer-specific string, a compiler-specific string, an installer-specific string, a package-specific string, version information, and/or a digital signature.

In some examples, the systems described herein may also: 1) identify a cluster of malware samples in the set of malware samples, 2) analyze a subset of malware samples in the cluster to identify at least one common property, and 3) ascribe the common property to at least one malware sample that is in the cluster but not in the subset. In some examples, the common property may include a behavioral property. Additionally or alternatively, the systems described herein may: 1) identify a cluster of malware samples in the set of malware samples and 2) generate a signature capable of identifying malware samples in the cluster.

As will be explained below, by clustering malware samples based on static strings that the malware samples have in common, the systems and methods described herein may reduce the time and resources required to analyze large sets of malware samples. Furthermore, by generating a generic signature to describe a cluster of malware samples, these systems and methods may reduce the number of signatures necessary to provide anti-malware protection, potentially reducing the resources needed to propagate, store, and use signatures. Additionally, these systems and methods may efficiently cluster malware samples to minimize the computational complexity necessary to cluster a set of malware samples.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for analyzing malware. In one example, the various systems described herein may accomplish this task by: 1) identifying a set of malware samples, 2) identifying, for each malware sample in the set of malware samples, a set of static strings present in the malware sample, and then 3) clustering the set of malware samples based on the set of static strings present in each malware sample.

Figure 1:
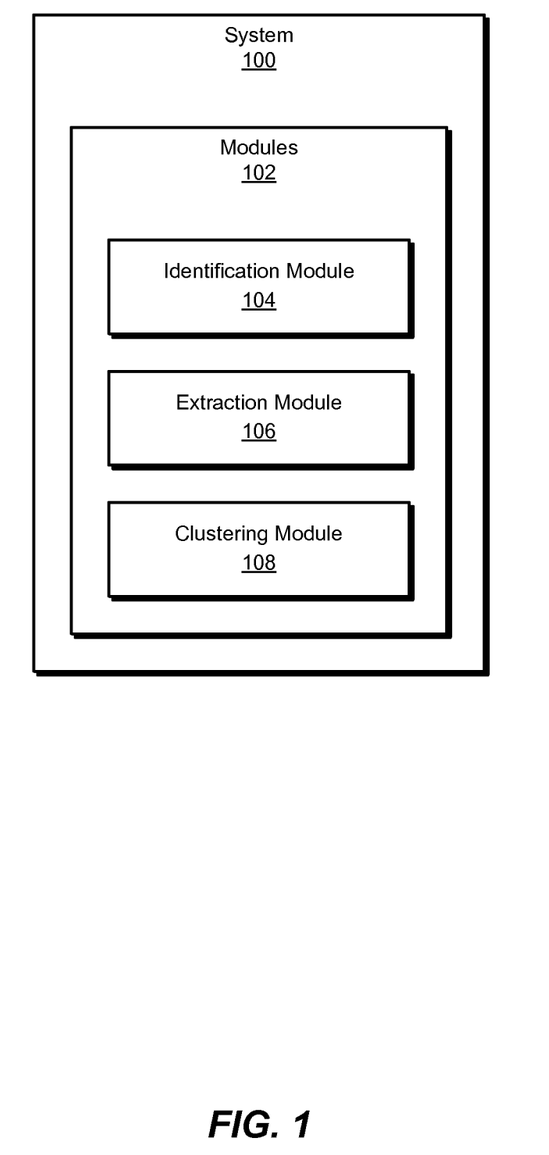
FIG. 1 is a block diagram of an exemplary system for analyzing malware.
Figure 2:
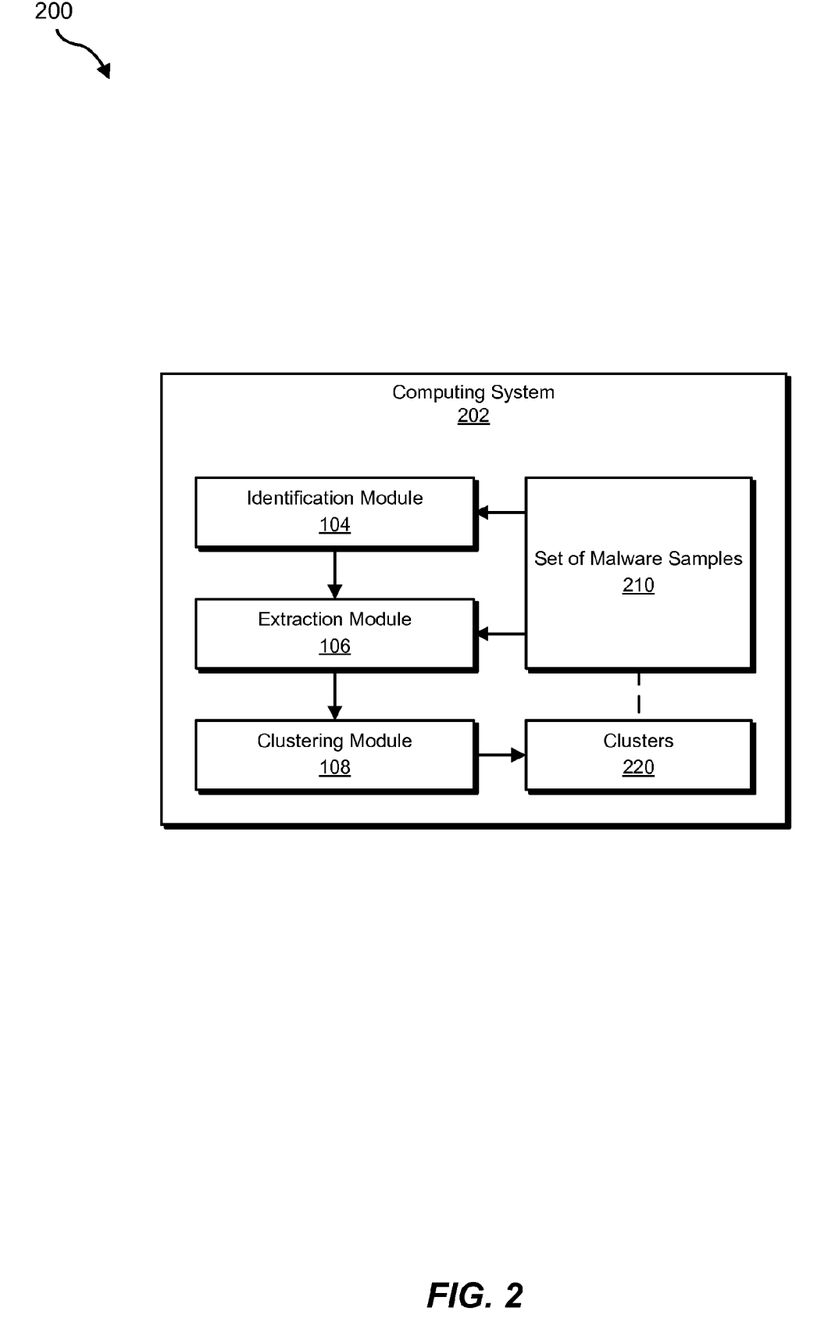
FIG. 2 is a block diagram of an exemplary system for analyzing malware.

The following will provide, with reference to FIGS. 1-2, detailed descriptions of exemplary systems for analyzing malware. Detailed descriptions of corresponding computer-implemented methods will also be provided in connection with FIGS. 3-5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for analyzing malware. As illustrated in this figure, exemplary system 100 may include one or more modules 102 for performing one or more tasks. For example, and as will be explained in greater detail below, exemplary system 100 may include an identification module 104 programmed to identify a set of malware samples. Exemplary system 100 may also include an extraction module 106 programmed to identify, for each malware sample in the set of malware samples, a set of static strings present in the malware sample.

In addition, and as will be described in greater detail below, exemplary system 100 may include a clustering module 108 programmed to cluster the set of malware samples based on the set of static strings present in each malware sample. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as computing system 202 illustrated in FIG. 2, computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be deployed in a variety of ways. For example, all or a portion of exemplary system 100 may represent portions of exemplary system 200 illustrated in FIG. 2. As shown in FIG. 2, system 200 may include a computing system 202 programmed with one or more modules. In one embodiment, and as will be described in greater detail below, modules 102 from FIG. 1 may program computing system 202 to: 1) identify a set of malware samples (such as a set of malware samples 210), 2) identify, for each malware sample in the set of malware samples, a set of static strings present in the malware sample (e.g., extract a set of static strings from each malware sample in set of malware samples 210), and then 3) cluster the set of malware samples based on the set of static strings present in each malware sample (e.g., create clusters 220 relating to set of malware samples 210).

Computing system 202 generally represents any type or form of computing device capable of reading computer-executable instructions. Examples of computing system 202 include, without limitation, laptops, desktops, servers, cellular phones, personal digital assistants (PDAs), multimedia players, embedded systems, combinations of one or more of the same, exemplary computing system 610 in FIG. 6, or any other suitable computing device.

Figure 3:
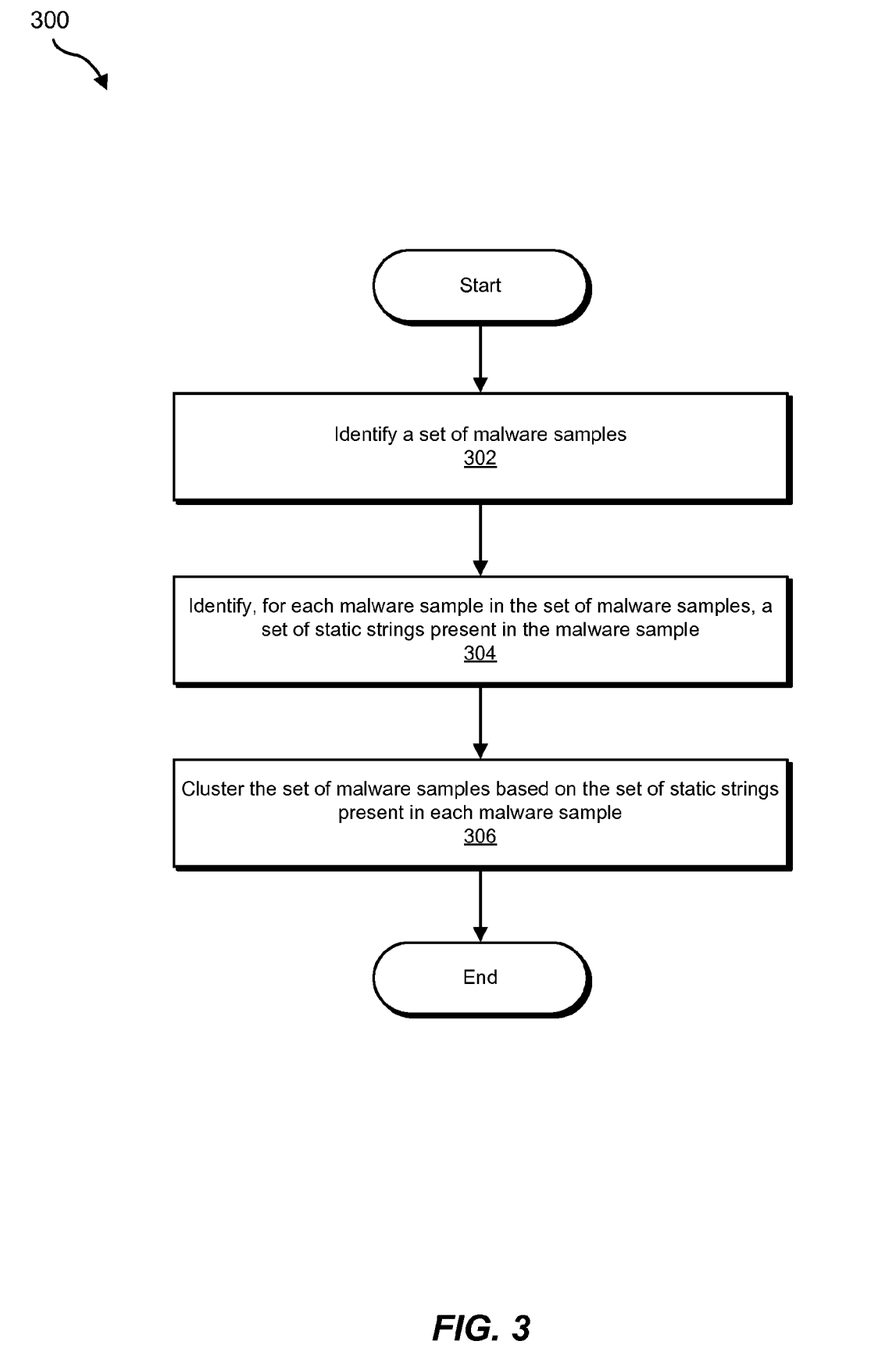
FIG. 3 is a flow diagram of an exemplary method for analyzing malware.

FIG. 3 is a flow diagram of an exemplary computer-implemented method 300 for analyzing malware. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may identify a set of malware samples. For example, at step 302 identification module 104 may, as part of computing system 202 in FIG. 2, identify a set of malware samples 210. As used herein, the term "malware" may refer to any virus, worm, Trojan horse, spyware, and/or any other malicious, illegitimate, and/or unauthorized software. Additionally, the term "malware sample" may refer to any copy and/or representation of a uniquely identifiable malware specimen.

Identification module 104 may perform step 302 in any suitable manner. For example, identification module 104 may identify the set of malware samples by accessing a database storing the malware samples. Additionally or alternatively, identification module 104 may identify the set of malware samples by reading a configuration file that identifies the malware samples. In some examples, identification module 104 may identify the set of malware samples by receiving a message identifying the set of malware samples.

At step 304, one or more of the systems described herein may identify, for each malware sample in the set of malware samples, a set of static strings present in the malware sample. For example, at step 304 extraction module 106 may, as part of computing system 202 in FIG. 2, identify, for each malware sample in set of malware samples 210, a set of static strings present in the malware sample. As used herein, the term "static string" may refer to any string of characters that may be present in a malware sample.

Extraction module 106 may perform step 304 in a variety of ways. For example, extraction module 106 may parse the malware sample for certain regular expressions. For example, extraction module 106 may parse the malware sample for human-readable strings (e.g., strings of alphanumeric and punctuation characters). In these examples, the set of static strings may include a set of human-readable strings (i.e., as opposed to strings of machine-readable instructions). Additionally or alternatively, extraction module 106 may parse the malware sample for more specific expressions (e.g., extraction module 106 may parse the malware sample for file paths). In some examples, extraction module 106 may search for static strings in certain locations of the malware sample (e.g., extraction module 106 may search for and extract static strings from a resource section of the malware sample). As will be described in greater detail below, once a static string has been identified in a malware sample, one or more of the modules described herein may record that the malware sample contained the static string.

In some examples, extraction module 106 may apply a function to a portion of the malware sample to derive a static string. For example, a malware sample may include a static string (such as a path name) represented in a compressed format. In this example, extraction module 106 may decompress the static string (e.g., to represent the static string in ASCII format).

The set of static strings may include a variety of strings. For example, the set of static strings may include a dynamic-link library ("DLL") name (e.g., a DLL used by the malware sample), an application programming interface ("API") identifier (e.g., a name of an API used by the malware sample), a section name (e.g., a functionless name for a section of an executable file), a file name and/or a file path (e.g., for a file accessed by the malware sample), a service identifier (e.g., a string identifying a service used by the malware sample), a process identifier (e.g., a string identifying a process used by the malware sample), an Internet address (e.g., a uniform resource locator accessed by the malware sample or promoted by the malware sample), a resource address, a registry entry (e.g., a string to be entered into a configuration database for an operating system), a globally unique identifier (e.g., a string used as a unique identifier for an object or resource, such as a class in a DLL, a database entry, etc.), a class identifier (e.g., a "CLSID" that identifies a component object model class), a string in a resource section (e.g., a resource section of a PORTABLE EXECUTABLE file), a batch file command (e.g., a script command to be executable by a command interpreter of an operating system), a packer-specific string (e.g., a string left by software for compressing a self-extracting executable file), a compiler-specific string (e.g., a string left by a compiler used for the malware), an installer-specific string, a package-specific string, version information, and/or a digital signature.

Returning to FIG. 3, at step 306 one or more of the systems described herein may cluster the set of malware samples based on the set of static strings present in each malware sample. For example, at step 306 clustering module 108 may, as part of computing system 202 in FIG. 2, cluster set of malware samples 210 based on the set of static strings present in each malware sample present in the set of malware samples 210. Upon completion of step 306, exemplary method 300 in FIG. 3 may terminate.

Clustering module 108 may perform step 306 in a variety of ways. For example, clustering module 108 may cluster the set of malware samples based on the percentage of static strings shared between malware samples. Clustering module 108 may generally use any appropriate statistical analysis, machine learning, and/or clustering technique to cluster the set of malware samples. In order to apply static string incidence data to clustering, clustering module 108 may create a vector for each malware sample in the set of malware samples. For example, clustering module 108 may create a vector for each malware sample such that each dimension in the vector indicates whether the malware sample includes a corresponding string. For example, the vector may be of a fixed length representing the number of different static strings to be considered in the clustering process, with each dimension in the vector corresponding to a specific static string. In this example, clustering module 108 may set a dimension in a vector for a malware sample to "1" if the malware sample includes the corresponding static string and to "0" if the malware sample does not include the corresponding static string.

In some examples, clustering module 108 may cluster the set of malware samples using a streaming clustering technique. For example, clustering module 108 may identify a set of clusters and sequentially add malware samples to the set of clusters. For example, clustering module 108 may, for each malware sample in the set of malware samples in sequence, identify a candidate cluster in the set of clusters that corresponds most strongly with the malware sample based on the set of static strings present in the malware sample. Clustering module 108 may then add the malware sample to the candidate cluster.

In some examples, clustering module 108 may identify a minimum correlation threshold for adding a malware sample to an existing cluster in the set of clusters. In these examples, clustering module 108 may determine that no cluster in the set of clusters meets the minimum threshold with respect to the malware sample (e.g., the minimum correlation threshold may be 0.6 and the strongest correlation between the malware sample and an existing cluster may be 0.4). Clustering module 108 may accordingly identify a new cluster in the set of clusters as the candidate cluster. For example, clustering module 108 may create a new cluster for the malware sample.

As detailed above, by sequentially clustering malware samples, the various systems and methods described herein may efficiently cluster a set of malware samples (e.g., with less than quadratic time and space complexity relative to the size of the set of malware samples).

Figure 4:
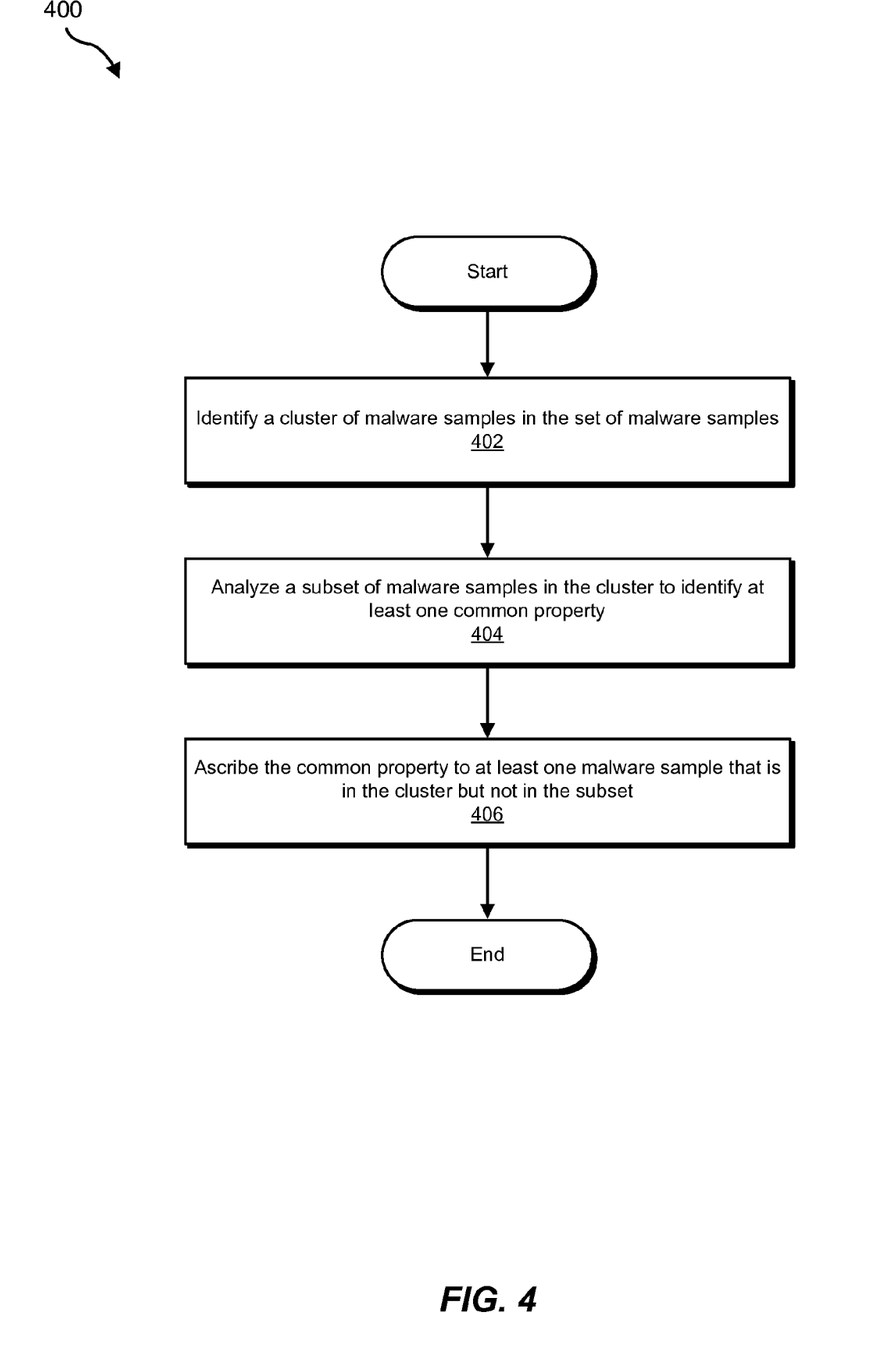
FIG. 4 is a flow diagram of an exemplary method for analyzing malware.

FIG. 4 is a flow diagram of an additional exemplary computer-implemented method 400 for analyzing malware. The steps shown in FIG. 4 may be performed by any suitable computer-executable code and/or computing system. In some embodiments, the steps shown in FIG. 4 may be performed by one or more of the components of system 100 in FIG. 1 and/or system 200 in FIG. 2.

As illustrated in FIG. 4, at step 402 one or more of the systems described herein may identify a cluster of malware samples within a set of malware samples. For example, at step 402 clustering module 108 may, as part of computing system 202 in FIG. 2, identify a cluster within clusters 220.

Clustering module 108 may perform step 402 in any suitable manner. For example, clustering module 108 may identify the cluster of malware samples by reading a data structure representing the cluster. In some example, clustering module 108 may identify the cluster of malware samples in the process of identifying each cluster of malware samples in turn.

At step 404, one or more of the systems described herein may analyze a subset of malware samples in the cluster to identify at least one common property. For example, at step 404 clustering module 108 may, as part of computing system 202 in FIG. 2, analyze a subset of malware samples in the cluster in clusters 220 to identify at least one common property.

Clustering module 108 may perform step 404 in any suitable manner. For example, clustering module 108 may scan each malware sample in the subset for an instruction or sequence of instructions in common (e.g., a sequence of instructions used to access a network). In some examples, the common property may include a behavioral property. As used herein, the term "behavioral property" may refer to any property of a malware sample that may affect the state of a computing system and/or one or more devices in communication with the computing system. In these examples, clustering module 108 may analyze the subset of malware samples by identifying one or more behavioral properties of the subset of malware samples. For example clustering module 108 may run each of the malware samples in the subset of malware samples in a virtual environment to ascertain the behavioral properties of each malware sample.

Clustering module 108 may determine that a property present in the subset of malware samples is a common property to the subset of malware samples using any suitable criteria. For example, clustering module 108 may identify the common property by identifying a property common to all malware samples in the subset of malware samples. In another example, clustering module 108 may identify the common property by identifying a property common to a predetermined percentage of the malware samples (e.g., a statistically significant percentage of the malware samples given the size of the subset).

At step 406, one or more of the systems described herein may ascribe the common property to at least one malware sample that is in the cluster but not in the subset. For example, at step 406 clustering module 108 may, as part of computing system 202 in FIG. 2, ascribe the common property to at least one malware sample in the cluster in clusters 220. Upon completion of step 406, exemplary method 400 in FIG. 4 may terminate.

Clustering module 108 may perform step 406 in any suitable manner. For example, clustering module 108 may ascribe the common property to the malware sample by ascribing the common property to the cluster. For example, clustering module 108 may draw an inference that every malware sample in the cluster likely attempts to access a network because the majority of malware samples in the subset of malware samples included a sequence of instructions to do so. Clustering module 108 may accordingly associate the common property with the cluster and/or the malware samples in the cluster in a database.

As detailed above, by analyzing a subset of a cluster and applying the analysis to the cluster, the various systems and methods described herein may more efficiently ascribe traits to malware samples and reduce time and computing resources used for analyzing malware samples.

Figure 5:
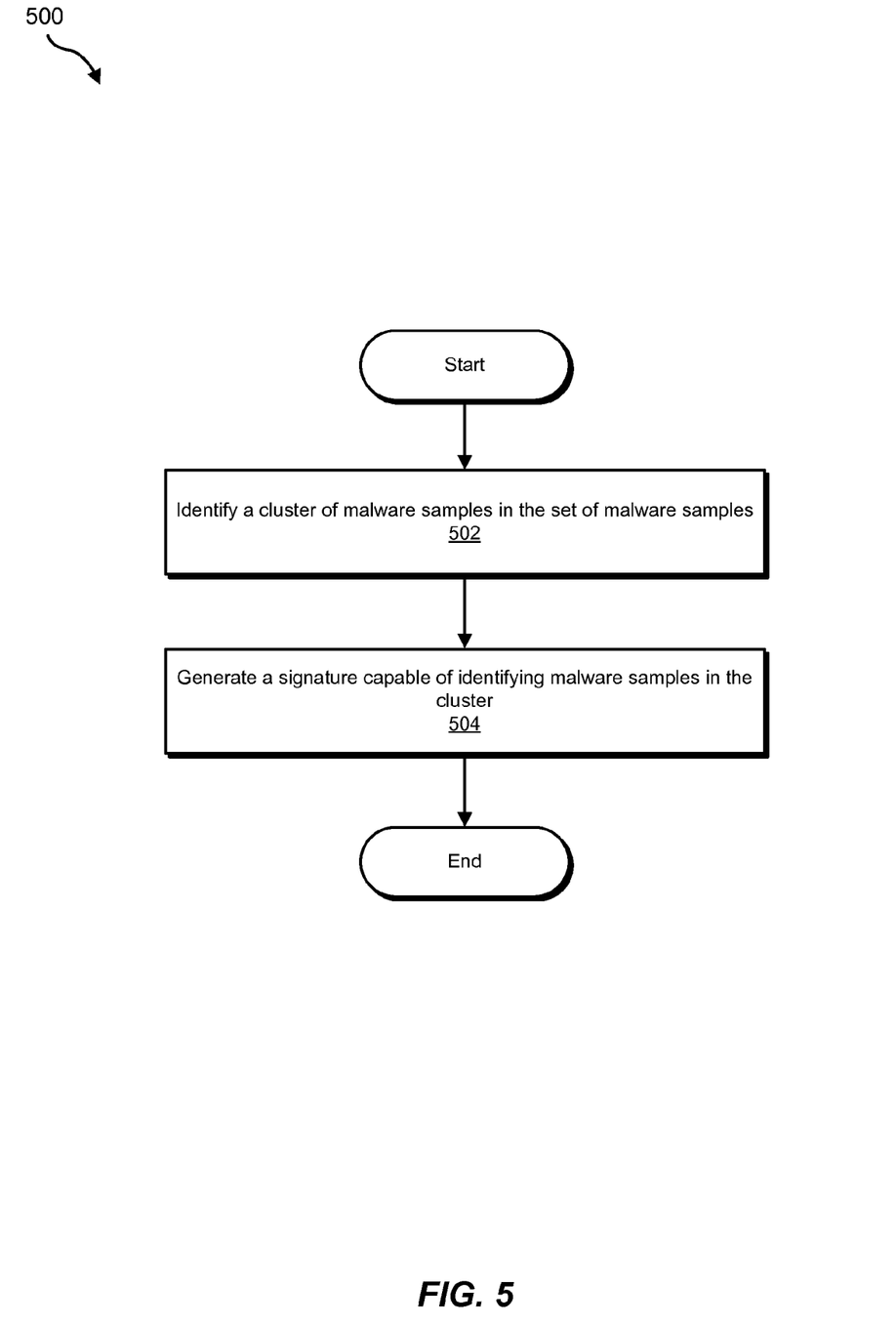
FIG. 5 is a flow diagram of an exemplary method for analyzing malware.

FIG. 5 is a flow diagram of an additional exemplary computer-implemented method 500 for analyzing malware. The steps shown in FIG. 5 may be performed by any suitable computer-executable code and/or computing system. In some embodiments, the steps shown in FIG. 5 may be performed by one or more of the components of system 100 in FIG. 1 and/or system 200 in FIG. 2.

As illustrated in FIG. 5, at step 502 one or more of the systems described herein may identify a cluster of malware samples within a set of malware samples. For example, at step 502 clustering module 108 may, as part of computing system 202 in FIG. 2, identify a cluster in clusters 220.

Clustering module 108 may perform step 502 in any suitable manner. For example, clustering module 108 may identify the cluster of malware samples by reading a data structure representing the cluster. In some example, clustering module 108 may identify the cluster of malware samples in the process of identifying each cluster of malware samples in turn.

At step 504, one or more of the systems described herein may generate a signature capable of identifying malware samples in the cluster. For example, at step 504 clustering module 108 may, as part of computing system 202 in FIG. 2, generate a signature capable of identifying malware samples in a cluster in clusters 220. Upon completion of step 504, exemplary method 500 in FIG. 5 may terminate.

Clustering module 108 may perform step 504 in a variety of ways. For example, clustering module 108 may generate the signature capable of identifying malware samples in the cluster by isolating common portions of malware samples in the cluster and generating a signature based on the common portions. In some examples, clustering module 108 may generate the signature to be capable of identifying each and every malware sample in the cluster. Additionally or alternatively, clustering module 108 may generate the signature to be capable of identifying a certain percentage of malware samples in the cluster, or to optimize the number of malware samples identified while taking false negatives and/or false positives as constraints (by, e.g., generating a signature to identify as many malware samples in the cluster as possible without generating too many false positives on benign samples).

As detailed above, by clustering malware samples based on static strings that the malware samples have in common, the systems and methods described herein may reduce the time and resources required to analyze large sets of malware samples. Furthermore, by generating a generic signature to describe a cluster of malware samples, these systems and methods may reduce the number of signatures necessary to provide anti-malware protection, potentially reducing the resources needed to propagate, store, and use signatures. Additionally, these systems and methods may efficiently cluster malware samples to minimize the computational complexity necessary to cluster a set of malware samples.

The various systems and methods described herein may be deployed in a variety of ways. For example, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

Figure 6:
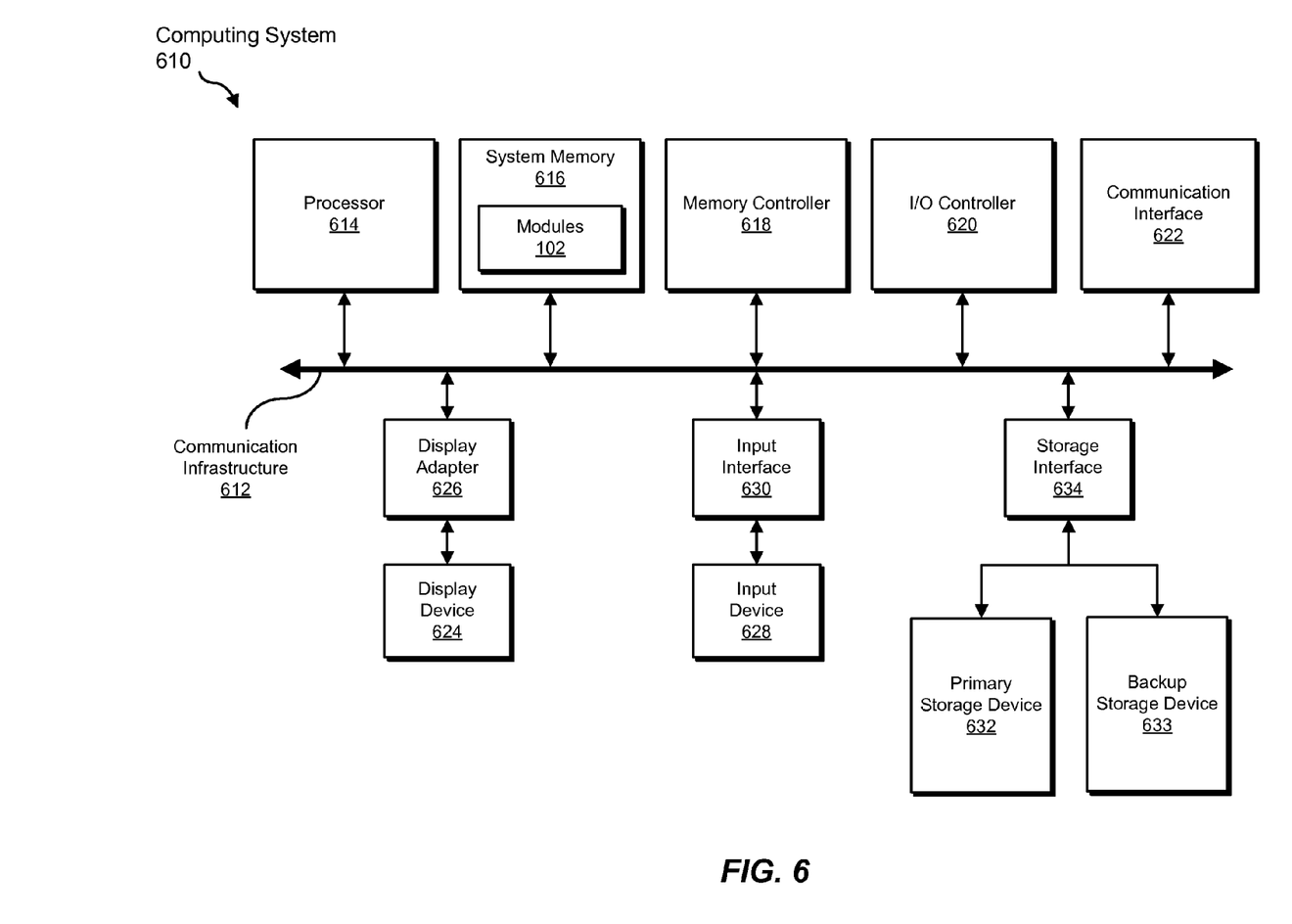
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the identifying, clustering, creating, adding, analyzing, ascribing, determining, and/or generating steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an input/output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller 618 may perform and/or be a means for performing, either alone or in combination with other elements, one or more of the steps or features described and/or illustrated herein, such as identifying, clustering, creating, adding, analyzing, ascribing, determining, and/or generating.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for performing, either alone or in combination with other elements, one or more of the identifying, clustering, creating, adding, analyzing, ascribing, determining, and/or generating steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the identifying, clustering, creating, adding, analyzing, ascribing, determining, and/or generating steps disclosed herein. Communication interface 622 may also be used to perform and/or be a means for performing other steps and features set forth in the instant disclosure.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the identifying, clustering, creating, adding, analyzing, ascribing, determining, and/or generating steps disclosed herein. Input device 628 may also be used to perform and/or be a means for performing other steps and features set forth in the instant disclosure.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, storage devices 632 and 633 may be used, for example, to perform and/or be a means for performing, either alone or in combination with other elements, one or more of the identifying, clustering, creating, adding, analyzing, ascribing, determining, and/or generating steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
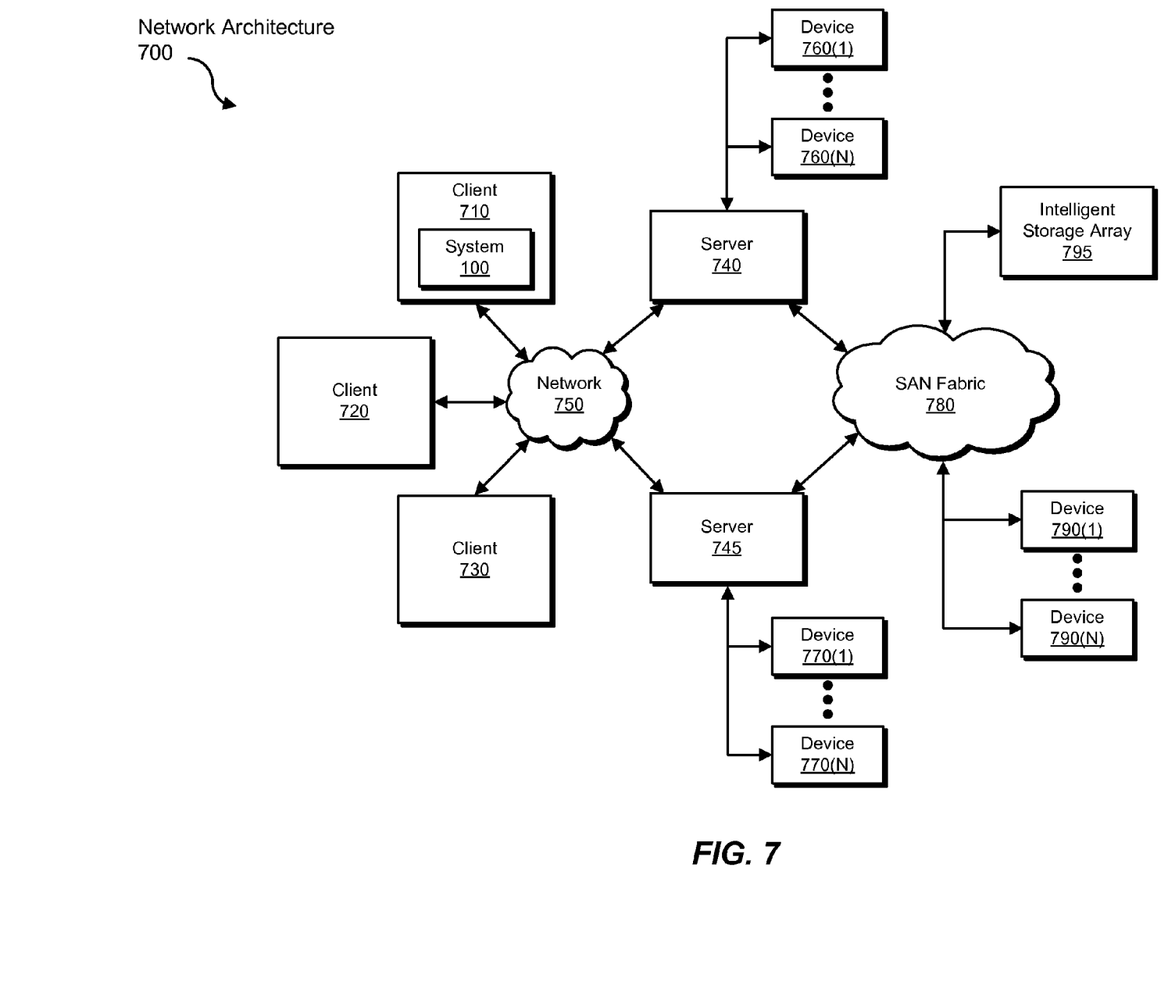
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. In one example, client system 710 may include system 100 from FIG. 1.

Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the identifying, clustering, creating, adding, analyzing, ascribing, determining, and/or generating steps disclosed herein. Network architecture 700 may also be used to perform and/or be a means for performing other steps and features set forth in the instant disclosure.

As detailed above, computing system 610 and/or one or more components of network architecture 700 may perform and/or be a means for performing, either alone or in combination with other elements, one or more steps of an exemplary method for analyzing malware.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a computing system into a computing system for clustering and/or analyzing malware samples. As another example, one or more of the modules described herein may transform a set of malware samples into a clustered set of malware samples.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for analyzing malware, the method comprising:
    identifying a set of malware samples, wherein each malware sample within the set of malware samples is unique relative to all other malware samples within the set of malware samples;
    identifying, for each malware sample in the set of malware samples, a set of static strings present in the malware sample;
    clustering, based on the set of static strings present in each malware sample, the set of malware samples into at least one cluster of malware samples by creating a vector for each malware sample in the set of malware samples, with each dimension in the vector indicating whether the malware sample comprises a corresponding static string;
    generating a generic signature for the cluster of malware samples that is capable of identifying malware samples in the cluster based at least in part on an analysis of static strings present in the malware samples;
    wherein the computer-implemented method is performed by a computing device comprising at least one processor.

2. The computer-implemented method of claim 1, further comprising:
    analyzing a subset of malware samples in the cluster to identify at least one common property;
    ascribing the common property to at least one malware sample that is in the cluster but not in the subset.

3. The computer-implemented method of claim 2, wherein the common property comprises a behavioral property.

4. The computer-implemented method of claim 1, wherein clustering the set of malware samples based on the set of static strings present in each malware sample comprises clustering the set of malware samples based on the percentage of static strings shared between malware samples.

5. The computer-implemented method of claim 1, wherein clustering the set of malware samples comprises, for each malware sample in the set of malware samples in sequence:
    identifying a set of clusters;
    identifying a candidate cluster in the set of clusters that correlates most strongly with the malware sample based on the set of static strings present in the malware sample;
    adding the malware sample to the candidate cluster.

6. The computer-implemented method of claim 5, wherein identifying the candidate cluster comprises:
    identifying a minimum correlation threshold;
    determining that no cluster in the set of clusters meets the minimum correlation threshold with respect to the malware sample;
    identifying a new cluster in the set of clusters as the candidate cluster.

7. The computer-implemented method of claim 1, wherein the set of static strings comprises a set of human-readable strings.

8. The computer-implemented method of claim 1, wherein the set of static strings comprises at least one of:
    a dynamic-link library name;
    an application programming interface identifier;
    a section name;
    a file name;
    a file path;
    a service identifier;
    a process identifier;
    an Internet address;
    a resource address;
    a registry entry;
    a globally unique identifier;
    a class identifier;
    a string in a resource section;
    a batch file command;
    a packer-specific string;
    a compiler-specific string;
    an installer-specific string;
    a package-specific string;
    version information;
    a digital signature.

9. The computer-implemented method of claim 1, further comprising performing a security action based on the clustering.

10. A system for analyzing malware, the system comprising:
an identification module programmed to identify a set of malware samples, wherein each malware sample within the set of malware samples is unique relative to all other malware samples within the set of malware samples;
an extraction module programmed to identify, for each malware sample in the set of malware samples, a set of static strings present in the malware sample;
a clustering module programmed to:
cluster, based on the set of static strings present in each malware sample, the set of malware samples into at least one cluster of malware samples by creating a vector for each malware sample in the set of malware samples, with each dimension in the vector indicating whether the malware sample comprises a corresponding static string;
generate a generic signature for the cluster of malware samples that is capable of identifying malware samples in the cluster based at least in part on an analysis of static strings present in the malware samples;
at least one hardware processor configured to execute the identification module, the extraction module, and the clustering module.

11. The system of claim 10, wherein the clustering module is further programmed to:
analyze a subset of malware samples in the cluster to identify at least one common property;
ascribe the common property to at least one malware sample that is in the cluster but not in the subset.

12. The system of claim 11, wherein the common property comprises a behavioral property.

13. The system of claim 10, wherein the clustering module is programmed to cluster the set of malware samples based on the set of static strings present in each malware sample by clustering the set of malware samples based on the percentage of static strings shared between malware samples.

14. The system of claim 10, wherein the clustering module is programmed to cluster the set of malware samples by, for each malware sample in the set of malware samples in sequence:
identifying a set of clusters;
identifying a candidate cluster in the set of clusters that correlates most strongly with the malware sample based on the set of static strings present in the malware sample;
adding the malware sample to the candidate cluster.

15. The system of claim 14, wherein the clustering module is programmed to identify the candidate cluster by:
identifying a minimum correlation threshold;
determining that no cluster in the set of clusters meets the minimum correlation threshold with respect to the malware sample;
identifying a new cluster in the set of clusters as the candidate cluster.

16. A non-transitory computer-readable-storage medium comprising one or more computer-executable instructions that, when executed by at least one processor of a computing device, cause the computing device to:
identify a set of malware samples, wherein each malware sample within the set of malware samples is unique relative to all other malware samples within the set of malware samples;
identify, for each malware sample in the set of malware samples, a set of static strings present in the malware sample;
cluster, based on the set of static strings present in each malware sample, the set of malware samples into at least one cluster of malware samples by creating a vector for each malware sample in the set of malware samples, with each dimension in the vector indicating whether the malware sample comprises a corresponding static string;
generate a generic signature for the cluster of malware samples that is capable of identifying malware samples in the cluster based at least in part on an analysis of static strings present in the malware samples.

* * * * *